Patented Mar. 20, 1928.

1,663,234

UNITED STATES PATENT OFFICE.

WILLIAM C. ARSEM, OF SCHENECTADY, NEW YORK, ASSIGNOR TO INDUSTRIAL TECHNICS CORPORATION, OF SCHENECTADY, NEW YORK, A CORPORATION OF NEW YORK.

LEVULOSE FROM SOLUBLE NONSUGAR CARBOHYDRATES OF THE DAHLIA.

No Drawing. Application filed January 31, 1927. Serial No. 165,044.

This invention relates to the production of levulose and more particularly to the preparation of levulose from soluble non-sugar carbohydrates remaining in the liquid or juice from dahlia bulbs, Jerusalem artichoke, chicory, elecampane, and burdock and similar plants from which the inulin has been removed.

It has been found that a low cost sugar in the form of syrup, crystals, powder and the like, which can be substituted for sucrose, can be obtained from inulin-bearing plants by removing the juice, extracting the inulin and hydrolyzing it to produce levulose. Thus, in my copending application, Serial No. 424,459, filed November 16, 1920, (now Patent No. 1,616,167, granted February 1, 1927), I have disclosed and claimed a process of extracting inulin from dahlia bulbs and the like in which the bulbs are comminuted to separate the juice from the vegetable material, the juice then clarified and the inulin subsequently separated therefrom. After the juice has been clarified, the inulin may be separated by crystallization. The juices, however, contain other non-sugar carbohydrates which cannot be removed by crystallization but which can be hydrolyzed to produce levulose and the levulose then separated from the liquid. Thus, by hydrolyzing the non-sugar carbohydrates contained in the juice of inulin-bearing plants, after the inulin has been removed, I increase the amount of levulose recovered.

I accordingly hydrolyze this liquid, or the non-sugar carbohydrates in the liquid, and separate the levulose therefrom. Various methods may be employed to hydrolyze the non-sugar carbohydrates. Practically any of the methods now employed for producing levulose by hydrolysis may be used. I preferably employ the method disclosed in my copending application, Serial No. 484,153, filed July 12, 1921 (now Patent No. 1,616,169, granted February 1, 1927), wherein the liquid is submitted to the action of an acid in any selected concentration and the action continued until the value of the negative rotation of polarized light produced by the solution passes through a maximum negative value, then decreases and again increases and passes through a second maximum negative rotation of polarized light. When the carbohydrates of the liquid have been entirely converted into levulose, the levulose produced by the hydrolysis may be separated from the liquid by concentrating the solution to a desired point, preferably about 90 per cent, and seeding with levulose crystals. The liquid, however, contains certain organic compounds which may impart an undesirable flavor to the product and instead of first removing the levulose, these impurities, a large fraction of which are of a fermentable nature, can be removed by treatment with a suitable fermenting agent. After the hydrolysis, the solution may be cooled and pepsin, trypsin or other fermenting agent added and fermentation permitted to continue until the protein impurities are broken down. The levulose may then be removed from the solution in the manner described above.

In a typical embodiment of the invention, the juice of the dahlia bulbs or other inulin bearing plants is first separated from the vegetable material. This may be done by comminuting the inulin-bearing plants and expressing the sap therefrom, obtaining a liquid containing inulin in a more or less solid form or in the form of a colloid associated and combined with impurities. In order to obtain a maximum yield of inulin, it is first necessary to clarify this juice to increase its purity and convert the impurities into such form that their subsequent removal by filtration is rendered somewhat easier. Various methods of clarifying the juice may be employed, but I prefer to employ the process disclosed in my application, Serial No. 424,459, in which the initial clarification of the inulin-containing juice is effected by adding to the juice substantially equivalent amounts of calcium hydroxide and calcium chloride.

After the juice has been clarified, the inulin may be separated therefrom in any desired manner. Thus, the juice may be neutralized, or brought to near the neutral point by the addition of acid and evaporated until the concentration of inulin is about 10 per cent or more. The solution may then be permitted to cool and acetic acid added until the concentration of the acetic acid is about .01 N. The separation of the inulin may then be completed by adding powdered inulin or a suspension of inulin in water to the solution to act as seed.

After the inulin has been separated from the juice, the liquid contains non-sugar carbohydrates which cannot be removed by crystallization, but which, I have found, may be converted into levulose by hydrolysis. I accordingly hydrolyze the non-sugar carbohydrates remaining in the liquid after the inulin has been removed. This may be done in various ways but I prefer to hydrolyze these carbohydrates by the method disclosed in my copending application, Serial No. 484,153. The juice is placed in an acid-proof vessel provided with an agitator and heating means and is heated to a temperature of about 100° C. with continuous stirring. Various acids may be employed in hydrolyzing the non-sugar carbohydrates. Tartaric acid may be employed and is added to the heated liquid in an amount necessary to make the solution .005 N, assuming that the tartaric acid functions as a mono-basic acid, only the first H ion being active. The proper amount of tartaric acid based on the amount of carbohydrates present in the liquid is added to the heated solution and the heating continued for two or three hours or until approximately 100 per cent of the non-sugar carbohydrates has been converted into levulose as determined by polariscopic tests, as described in my copending application, Serial No. 484,153.

After the hydrolysis of the mixture, the solution may be concentrated by evaporation under reduced pressure at a low temperature until it contains about 90 per cent levulose and the levulose may then be removed. To remove the levulose from the liquid it is first cooled, then seeded with levulose crystals and then agitated until a certain quantity of levulose is crystallized out. The crystals may be freed from the molasses by centrifuging, and the latter may be again concentrated by evaporation as before, and a second crop of levulose crystals may be obtained. The liquid containing the non-sugar carbohydrates also contains certain organic substances which may impart an undesirable flavor to the product. These impurities may be removed by fermenting, either before or after hydrolyzing. A large fraction of the impurities is of a fermentable nature and can be removed by treatment with a suitable ferment, enzyme, bacterial culture or mould. Thus, the syrup may be cooled to about 37° and pepsin or other ferment added. In place of pepsin, I may employ trypsin. After the fermenting agent has been added, fermentation is permitted to go on until the protein impurities are broken down. After fermentation, the liquid may be hydrolyzed in the manner described above, or if the hydrolysis has already been performed, the levulose may be separated from the syrup by concentrating and seeding as heretofore described.

I claim:

1. The herein described process consisting essentially of hydrolyzing the non-sugar carbohydrates contained in the residue after inulin has been recovered from the juice of inulin-bearing plants, and separating the levulose formed from the juice.

2. The herein described process consisting essentially of hydrolyzing the non-sugar carbohydrates contained in the residue after inulin has been recovered from the juice of inulin-bearing plants, fermenting to remove impurities and separating the levulose formed from the juice.

3. The herein described process consisting essentially of hydrolyzing the non-sugar carbohydrates contained in the residue after inulin has been recovered from the juice of inulin-bearing plants, concentrating the solution and removing the levulose formed by seeding it with levulose crystals.

4. The herein described process consisting essentially of adding sufficient acid to the residue remaining after inulin has been recovered from inulin-bearing plants to hydrolyze the non-sugar carbohydrates remaining in the juice and heating the juice to hydrolyze it and form levulose.

5. The herein described process consisting essentially of adding sufficient acid to the residue remaining after inulin has been recovered from inulin-bearing plants to hydrolyze the non-sugar carbohydrates remaining in the juice, heating the juice to hydrolyze it and form levulose, and fermenting the juice to remove organic impurities.

6. The herein described process consisting essentially of adding sufficient acid to the residue remaining after inulin has been recovered from inulin-bearing plants to hydrolyze the non-sugar carbohydrates remaining in the juice, heating the juice to hydrolyze it and form levulose, and concentrating the solution to separate the levulose therefrom.

7. The herein described process consisting essentially of hydrolyzing the non-sugar carbohydrates contained in the residue after inulin has been recovered from the juice of inulin-bearing plants, evaporating the solution under reduced pressure and at low temperature until concentrated to substantially 90 percent levulose and removing the levulose from the solution.

8. The herein described process consisting essentially of adding sufficient acid to the residue remaining after inulin has been recovered from the juice of inulin-bearing plants to hydrolyze non-sugar carbohydrates contained therein, heating the juice to hydrolyze the non-sugar carbohydrates and form levulose, evaporating the resulting product under reduced pressure and at a low temperature until it is concentrated to substantially 90 per cent levulose and separating the levulose therefrom.

In testimony whereof I affix my signature.

WILLIAM C. ARSEM.